United States Patent [19]

Hasegawa

[11] Patent Number: 4,562,545

[45] Date of Patent: Dec. 31, 1985

[54] METHOD OF TAKING-IN INPUT DATA FOR MOTORCAR CONTROL

[75] Inventor: Taiji Hasegawa, Nakaminato, Japan

[73] Assignee: Hitachi, Ltd., Tokyo, Japan

[21] Appl. No.: 437,306

[22] Filed: Oct. 28, 1982

[30] Foreign Application Priority Data

Oct. 30, 1981 [JP] Japan .................................. 56-172752

[51] Int. Cl.[4] .......................... G05B 15/02; F02B 3/04
[52] U.S. Cl. ................................ 364/431.12; 364/138;
364/550; 123/480; 123/486
[58] Field of Search ................ 364/424, 140, 141, 138,
364/551, 431.12; 340/52 R, 52 F, 53, 66, 521,
347 AD; 123/480, 486, 478

[56] References Cited

U.S. PATENT DOCUMENTS

| | | | |
|---|---|---|---|
| 3,806,916 | 4/1974 | Diaz et al. | 340/347 M |
| 3,988,730 | 10/1976 | Valker | 340/52 F |
| 4,050,062 | 9/1977 | Crocker et al. | 364/900 |
| 4,115,847 | 9/1978 | Osder et al. | 364/424 |
| 4,212,064 | 7/1980 | Forsythe et al. | 364/424 |
| 4,258,421 | 3/1981 | Juhasz et al. | 340/52 F |
| 4,338,665 | 7/1982 | Aono et al. | 364/424 |
| 4,398,258 | 8/1983 | Naitoh et al. | 364/424 |

OTHER PUBLICATIONS

Beck, "Direct Digital-to-Analog Values Storage", vol. 9, No. 4, Sep. 1966, p. 380, *IBM Technical Disclosure Bulletin.*

*Primary Examiner*—Errol A. Krass
*Assistant Examiner*—Thomas G. Black
*Attorney, Agent, or Firm*—Antonelli, Terry & Wands

[57] ABSTRACT

Disclosed is an input data taking-in method in a motorcar controlling system, which method comprises the steps of providing, in memory means, first areas for selectively correspondingly storing request signals for requesting taking-in of the respective outputs of sensors and second areas for selectively correspondingly storing the taken-in sensor outputs; searching the request signal at the first areas; causing a multiplexer and an A/D converter to operate on the basis of the result of the searching; and setting the output of the A/D converter in the second areas of the memory means in response to a signal indicating the completion of operation of the A/D converter.

6 Claims, 4 Drawing Figures

FIG. 4

| ADDRESS | | | | | |
|---|---|---|---|---|---|
| A000 | $Q_0$ (SENSOR 127) | $I_0$ | $R_0$ | $G_0$ | |
| A001 | $Q_1$ (SENSOR 152) | $I_1$ | $R_1$ | $G_1$ | |
| ⋮ | ⋮ | ⋮ | ⋮ | ⋮ | |
| A0n | $Q_n$ (CHECK POINT $V_4$) | $I_n$ | $R_n$ | $G_n$ | |
| A100 | ADR − FLAG ||||| 
| ⋮ | ⋮ ||||| 
| A200 | DATA OF SENSOR 24 (CORRESPONDING TO $Q_0$) |||||
| 1 | DATA OF SENSOR 152 (CORRESPONDING TO $Q_1$) |||||
| 2 | DATA OF SENSOR 158 (CORRESPONDING TO $Q_2$) |||||
| ⋮ | ⋮ |||||
| D | DATA OF SENSOR 126 (CORRESPONDING TO $Q_{13}$) |||||
| E | DATA OF ADJUSTING VOLTAGE TERMINAL $V_1$ (CORRESPONDING TO $Q_{14}$) |||||
| F | DATA OF ADJUSTING VOLTAGE TERMINAL $V_2$ (CORRESPONDING TO $Q_{15}$) |||||
| A210 | DATA OF CHECK POINT $V_3$ (CORRESPONDING TO $Q_{16}$) |||||
| A211 | DATA OF CHECK POINT $V_4$ (CORRESPONDING TO $Q_{17}$) ||||| ns
METHOD OF TAKING-IN INPUT DATA FOR MOTORCAR CONTROL

BACKGROUND OF THE INVENTION

The present invention relates to a method of taking-in input data for controlling a motorcar and particularly to a method of taking-in input data in which a plurality of input data for a plurality of controls are taken in by commonly using an analog-to-digital (A/D) converter.

Recently, a microcomputer has been used in order to improve various kinds of control functions in a motorcar or automobile (hereinafter simply referred to as "car"). In a system using a microcomputer, however, it has been required to provide numbers of input devices corresponding to the various kinds of control functions in accordance with the various kinds and various uses of the cars.

As known well, the car control is attained by taking-in various measurement values from sensors mounted at various portions in the car. As such sensors, there are provided, for example, a water temperature sensor (TW), an atmosphere temperature sensor (TA1), a car room temperature sensor (TA2), a humidity sensor (VW), a suction amount sensor (QA), an exhaust gas sensor (Vλ), a throttle angle sensor (VT), a battery voltage sensor (VB), an AC generator output voltage sensor (VG), etc. The parenthesized letters represent the respective output values of the sensors. The measurement result of each of these sensors is produced with an analog value. Further, to these sensors, there may be provided adjusting voltage terminals ($V_1$, $V_2$), checking points ($V_3$, $V_4$), etc. which are supplied with analog values, while they are not analog sensors. Further, there are provided an engine speed sensor (RPM), a wheel speed sensor (WS), a vehicle speed sensor (VS), a torque sensor (TR), etc. which output digital values.

The respective output of the previously-mentioned analog sensors are A/D converted for each of the kinds of controls to be used for controlling. That is, for example, since the output of the water temperature sensor (TW) is used for engine control as well as for car-cooler control, it has been necessary to provide two A/D converters for the respective controls.

Thus, in a conventional electronic car-control system, there have been provided individual input processing devices for the respective controls with a drawback that the circuit of the system becomes excessively large and large number of circuit elements are required.

SUMMARY OF THE INVENTION

One object of the present invention is to provide a method of taking-in input data for car control in which an input data taking-in circuit may be commonly used and may answer at high-speed to a plurality of control circuits.

According to a feature of the present invention, there is provided a commonly used memory which is provided with an area for setting input data taking-in request signals and another area for holding taken-in input data, whereby when an input data taking-in request has been set by a control circuit, an output data is taken-in from a sensor in accordance with the request and set in a portion of the input data holding area of the memory corresponding to the sensor. The held data is taken-in by the above-mentioned control circuit so as to be used for the controlling operation of the control circuit. Since the sensor output taking-in circuit may be commonly used for plural control circuits, the circuit configuration is simplified and the cost thereof is lowered.

BRIEF DESCRIPTION OF THE DRAWINGS

Other features of the present invention will be apparent from the following description about preferred embodiments of the present invention which will be made in conjunction with accompanied drawings in which:

FIG. 4 shows the configuration of an input data taking-in request signal area and an input data holding area in a random access memory (hereinafter abbreviated as RAM) 106 of FIG. 2.

DETAILED DESCRIPTION OF A PREFERRED EMBODIMENT

A preferred embodiment of the present invention will be now described by referring to the attached drawings.

Figure 1:
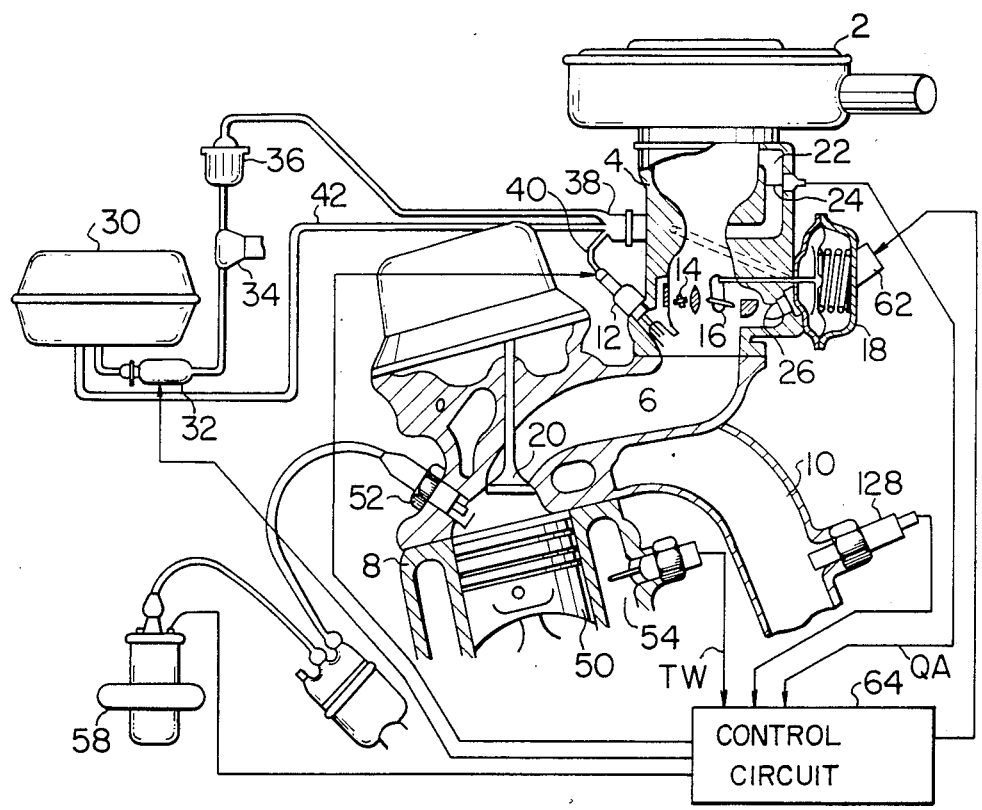
FIG. 1 shows a schematic system arrangement with various sensors and actuators for use in engine control and an engine control circuit according to an embodiment of the present invention.

FIG. 1 is a block diagram showing an engine control system according to an embodiment of the present invention.

In FIG. 1, intake air is supplied to a cylinder 8 through an air cleaner 2, a throttle chamber 4, and a suction pipe 6. Burned gas in the cylinder 8 is exhausted into the atmosphere through an exhaust pipe 10.

In the throttle chamber 4, there is provided a fuel injector 12. The fuel injected out of the fuel injector 12 is atomized in an air path in the throttle chamber 4 and mixed with the intake air to form a fuel-air mixture which is in turn supplied through the suction pipe 6 to a combustion chamber of the cylinder 8 when a suction valve 20 is opened.

There are provided throttle valves 14 and 16 in the neighborhood of the outlet of the fuel injector 12. The throttle valve 14 is so arranged as to mechanically communicate with an accelerator pedal (not shown) so that it may be driven by a car-driver. The throttle valve 16 is so arranged as to be driven by a diaphragm 18 such that it is fully closed when the air flow is small and begins to open so as to prevent the suction resistance from increasing as the air flow increases and therefore as the negative pressure to the diaphragm 18 increases.

There is provided an air path 22 at the upper stream of the throttle valves 14 and 16 of the throttle chamber 4, and there is provided in the air path 22 an electric heating element 24 constituting a thermal air flow meter or a suction amount sensor so as to obtain therefrom an electrical signal which changes in accordance with the air flow rate determined by the relation between the air flow rate and the amount of heat conduction of the heating element. Being provided within the air path 22, the heating element 24 is protected from a high temperature gas produced by a back-fire from the cylinder 8 and prevented from being contaminated by dust or the like in the intake air. The outlet of the air path 22 is opened in the neighborhood of the narrowest portion of the venturi and the inlet of the same is opened at the upper stream of the venturi.

The fuel to be fed to the injector 12 is first supplied from a fuel tank 30 to a fuel pressure regulator 38 through a fuel pump 32, a fuel dumper 34 and a filter 36. The pressured fuel is next fed from the fuel pressure regulator 38 to the injector 12 through a pipe 40. The fuel is returned back from the fuel pressure regulator 38 to the fuel tank 30 through a return pipe 42 so that the pressure difference is made constant always between the pressure in the suction pipe 6 to which the fuel is injected from the injector 12 and the pressure of the fuel supplied to the injector 12.

The fuel-air mixture sucked into the cylinder 8 through the suction valve 20 is compressed by a piston 50 and ignited by a spark generated by an ignition plug 52. The combustion is then converted into kinetic energy. The cylinder 8 is cooled by cooling water 54 and the temperature of which is measured by a water temperature sensor 56 so that the measured value TW is utilized as that indicating the engine temperature. An ignition coil 58 applies a high voltage to the ignition plug 52 in accordance with the ignition timing applied thereto.

On a crank shaft (not shown), there is provided a crank angle sensor (not shown) which produces a reference angle signal for and a position signal every reference crank angle and every predetermined angle (e.g. 0.5°), respectively, as the engine rotates. The output of the crank angle sensor, the output signal TW of the water temperature sensor 56 and the output signal QA from the heating element 24 constituting a suction amount sensor are applied to control circuit 64 comprising a microcomputer (not shown) so as to be computed thereat, so that the injector 12 and the ignition coil 58 are driven by output signals from the control circuit 64.

In the engine system controlled by the control system arranged as mentioned above, there is provided in the throttle chamber 4 a by-path 26 which communicates with the suction pipe 6 by taking a way around the throttle valve 16 and which is provided with an opening-controlled by pass valve 62. From the control circuit 64, a control signal is applied to a driving unit of the by-pass valve 62 to control the opening thereof.

The by-pass valve 62 is placed adjacent the by-pass 26 which is arranged to provide a way around the throttle valve 16, with the opening of the by-pass valve 62 being controlled by a pulse current. The by-pass valve 62 is so arranged to change the cross section of the by-pass 26 by the lift amount of the valve. A by-pass valve driving system (not shown) driven by an output signal of the control circuit 64 controls the lift amount of the by-pass valve 62. In particular, the control circuit 64 produces an opening/closing period signal for controlling the by-pass valve driving system so that the by-pass valve driving system applies a control signal to the driving unit of the by-pass valve 62, for adjusting the lift amount of the by-pass valve 62, based on the opening/closing period signal.

Figure 2:
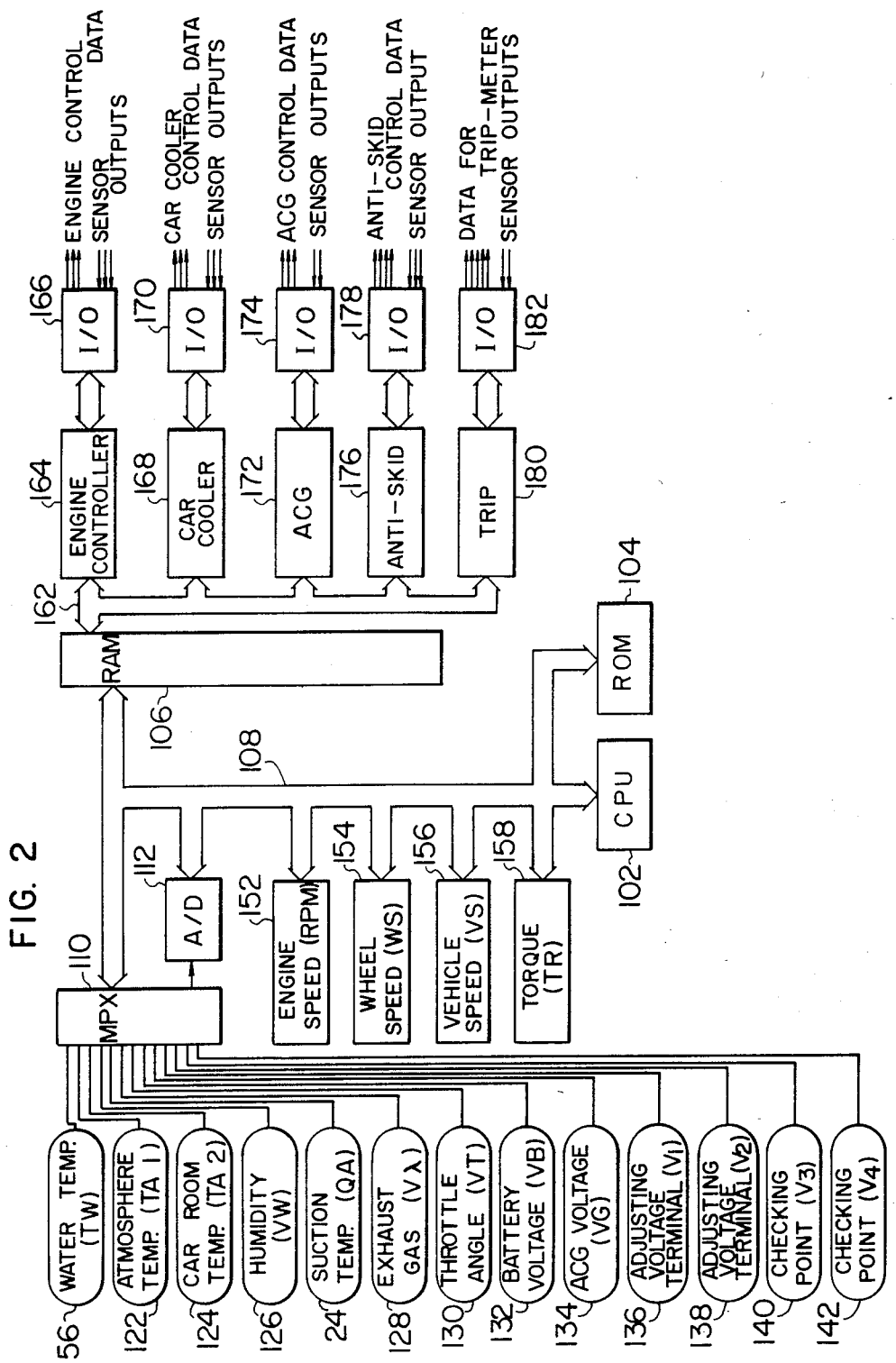
FIG. 2 is a schematic block diagram of an embodiment of the present invention.

FIG. 2 is a block diagram of the control system according to an embodiment of the invention.

In FIG. 2, a central processing unit (hereinafter abbreviated as CPU) 102, a read only memory (hereinafter abbreviated as ROM) 104 and a RAM 106 are connected to one another through a bus line 108. A multiplexer (hereinafter abbreviated as MPX) 110 and an A/D converter 112 are also connected to the bus line 108. Various analog sensors, i.e. a water temperature sensor 56, an atmosphere temperature sensor 122, a car-room temperature sensor 124, a humidity sensor 126, a suction amount sensor 24, an exhaust gas sensor 128, a throttle angle sensor 130, a battery voltage sensor 132, an AC generator output voltage sensor 134, adjusting voltage input terminals 136, 138, and checking points 140, 142, are connected to the MPX 110. An analog signal of the MPX 110 is in turn applied to the A/D converter 112. The MPX 110 selects the analog sensors in accordance with the request from the CPU 102 and applies an analog output of the selected one of the analog sensors to the A/D converter 112 to be converted therein into a digital value. The thus converted digital value is loaded in a predetermined address in the RAM 106, through the bus line 108.

Further, various digital sensors, i.e. an engine speed sensor 152, a wheel speed sensor 154, a vehicle speed sensor 156 and a torque sensor 158, are connected to the bus line 108, so that respective outputs of these digital sensors may be loaded in the predetermined addresses in the RAM 106 in accordance with the request by the CPU 102. An engine controlling device 164, a car-cooler or air-conditioner controlling device 168, an AC generator controlling device 172, an anti-skid controlling device 176 and a trip computer 180 are connected to the RAM 106 through a bus line 162, so that the respective outputs of these devices 164, 168, 172, 176 and 180 are applied to various actuators and/or indicators (not shown) through corresponding input/output (hereinafter abbreviated as I/O) units 166, 170, 174, 178 and 182. The respective controlling devices 164, 168, 172, 176 and 180 receive one-bit signals through the corresponding I/O units 166, 170, 174, 178 and 182 and perform engine controlling, car-cooler or air-conditioner controlling, AC generator output voltage controlling, anti-skid controlling and trip data computing, on the basis of the received one-bit signals and common input data of the RAM 106. The computing method per se has been known.

Assuming now that, for example, it is necessary to obtain the data relating to the suction air-amount, the controller 164 operates to give a request to the CPU 102 by setting a suction air-amount request in the RAM 106. The CPU 102 responds to the request at high-speed. However, the respective analog outputs of several ones of the sensors may quickly change while those of other ones, such as the water temperature sensor, may not so quickly vary. In view of such various characteristics of the analog sensors, therefore, there is provided a priority order in detection. To this end, flags $Q_o, Q_1, \ldots, Q_n$ are allotted to the respective analog output signals of the analog sensors, the flag $Q_o$ indicating the highest priority and the flag $Q_n$ indicating the lowest priority. On the other hand, the respective outputs of the sensors 152, 154, 156 and 158 in the form of a pulse train signal are always detected and held in a register in each sensor, so that the CPU 102 can fetch necessary data from a desired one of the sensors at any time.

Now, if any one Q-flag of the flags $Q_o$–$Q_n$ has been set, the CPU 102 takes thereinto the digital value corresponding to the output of the sensor specified by the set Q-flag and the taken-in data is set in the address of the RAM 106 corresponding to the set Q-flag. In the case where plural ones of the flags $Q_o$–$Q_n$ have been set, the above-mentioned operation is effected in the priority order of the set Q-flags. Since the data taking-in operation is completed within a predetermined period of time, each of the controlling devices 164, 168, 172, 176 and 180 can obtain its required data by trying to fetch it after the lapse of the above-mentioned predetermined period of time. Further, it is possible to check whether the CPU 102 has set a data in the RAM 106, by using the Q-flag.

Figure 3:
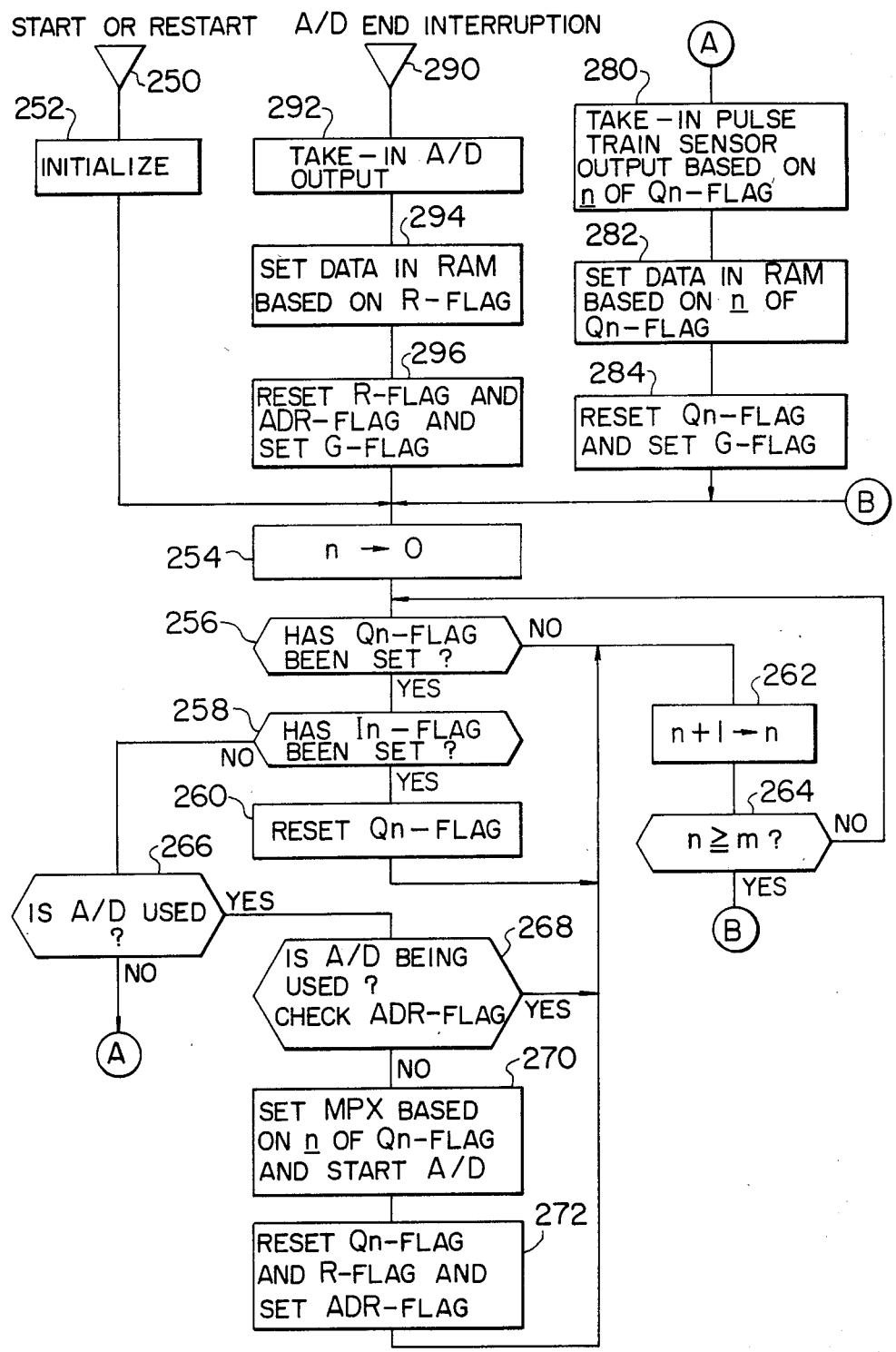
FIG. 3 is a flow chart illustrating an input data taking-in method.

Next, the function of the embodiment will be explained by using the flow chart of FIG. 3.

Upon the turning-on of the system power source, the operation shifts from the start point 250 to the step 252 at which initialization such as clearing the RAM 106 is performed. At the next step 254, the number n of flag $Q_n$ (n=0, ... n) is made zero because the Q-flag is searched in the priority order from the flag $Q_o$ having the uppermost priority. At the step 256, the flag $Q_n$ (n=0, ..., n) is checked. The flag $Q_n$ (n=0, ..., n) is set in the corresponding address A000–A0n in the RAM 106 from the respective controlling devices 164, 168, 172, 176 and 180. For example, the engine controlling device 164 sets the flag $Q_o$ in the address A000 every 10 msec in order to request the measured suction amount QA and this flag $Q_o$ is searched at the step 256.

If a request flag or any flag $Q_n$ (n=0, ..., n) has been set, judgement is made at the step 258 as to whether an A/D conversion inhibit flag $I_n$ (n=0, ..., n) has been set or not. That is, in the case where the A/D conversion inhibit flag $I_n$ has been set while the flag $Q_n$ (n=1, ..., n) has been set, the data taking-in operation is inhibited in response to the inhibit flag $I_n$ (n=0, ..., n) which data taking-in operation would otherwise be performed in response to the set flag $Q_n$ (n=0, ..., n). The function of the inhibit flag $I_n$ (n=0, ..., n,) will be particularly described. In the case where the control of the engine is more complex, such a failure or trouble may occur that the set Q-flag is not performed in spite of the fact that it has been set, that is in particular a data taking-in operation or an A/D converting operation can not be temporarily stopped in spite of the fact that a request for performing such an operation has been made. At this time, an inhibit flag $I_n$ (n=0, ..., n) is set to inhibit the performance of the data taking-in or A/D converting operation. Particularly, the operation of the engine varies according to various statuses, i.e. the starter start status before idling, the starting status, the idling status and the running status. For example, the car cooler control, the AC generator control, or the like are not always effected in a predetermined manner for all of these various operating statutes of the engine. For example, when the starter motor is rotating, the AC generator does not generate electric power and therefore it is not necessary for the AC generator to request to fetch the data with respect to its output. In such a case, the performance request flag $Q_n$ for fetching data every predetermined time is to prevent fetching of data in accordance with the inhibit flag $I_n$. The inhibit flag $I_n$ may be used also in case the whole system has broken down. That is, in this case, an inhibit flag $I_n$ is set to prevent the concerned operation for every failure inspection. Further, in the case where the data from the water temperature sensor is requested for two controls or more, e.g. engine control etc., the inhibit flag $I_n$ may be also used to inhibit the response to a request to detect the water temperature for a predetermined period of time after the value has been once detected, because the value of the output from the water temperature sensor does not suddenly change.

In this manner, it is checked, at the step 258, whether an inhibit flag $I_n$ has been set, and when any inhibit flag $I_n$ has been set, the flag $Q_n$ (n being the number of corresponding sensor) is reset at the step 260, and the operation shifts to the step 262. In the step 262, the number (n+1) is set in the number n. That is, for example, the flag $Q_o$ is altered to the flag $Q_1$. At the step 264, judgement is made whether the checking has completed with respect to all the sensors. If the checking has not been completed, the operation returns back to the step 256, and otherwise returns back to the step 254.

At the step 256, if it is determined that the flag $Q_n$ is "0" or no flag $Q_n$ has been set, similarly to the above-mentioned case, the operation moves to the step 262 at which the number n of flag $Q_n$ is increased by one count to shift the object to be checked in the step 256. In particular, the addresses which store flags $Q_o$–$Q_n$ as shown in FIG. 4 are shifted one after one.

In the case where a request flag $Q_n$ has been set while no inhibit flag $I_n$ has been set, the operation moves to the step 266 at which it is judged whether the output of the sensor indicated by the request flag $Q_n$ is in the form of an analog signal which requires the A/D converter 112 or in the form of a pulse train signal which does not required the A/D converter. This judgement is made in accordance with the numeral value of the number n of the request flag $Q_n$. That is, for example, if n=0 it means the output QA of the sensor 24 and therefore the A/D converter 112 is required, while if n=1 it means the output of the sensor 152 and therefore the A/D converter 112 is not required. When the A/D conversion is required, judgement is then made whether the A/D converter 112 is operating or not, at the step 268. To this end, the ADR-flag of FIG. 4 is used and it is determined that the A/D converter 112 is being used when the ADR-flag is "1" or has been set while not being used when the ADR-flag is "0" or has not been set.

At the step 270, the MPX 110 is set on the basis of the number n of the flag $Q_n$ so as to cause the A/D converter 112 to start. For example, if n=0 the MPX 110 selects the sensor 24. Since the response to the request flag $Q_n$ has completed when the A/D converter has been started, the request flag $Q_n$ is then reset and an R-flag representing the status that the request is now being performed, is set corresponding to the request flag $Q_n$. The ADR-flag representing the status that the A/D converter is now operating is also set. Since it takes several tens of seconds for the A/D converting operation, the operation is moved to the step 262 and the request flag to be searched is shifted. Although it is impossible to respond to the request of taking-in data by using the A/D converter because the A/D converter is now being used, it is possible to respond to the request to fetch the output of the sensors 152, 154, 156 and 158 because each of these sensors has a function to convert the sensed value into a digital value and hold the converted digital value therein.

Assuming now that the steps 270 and 272 have been performed when n=0, the number n of the flag $Q_n$ is caused to change to n=1 at the step 262 and the request flag which is to be detected at the step 256 is determined to be the flag $Q_1$. If the flag $Q_1$ is now "1" or has been set, it is possible to respond to the request to fetch the sensor 152 corresponding to the flag $Q_1$ because it is not necessary to use its A/D converter to perform the request. By moving in this manner from the step 272 to the step 262 and by shifting in the step 262 the request flag $Q_n$ which has been the object to be detected at the step 256, if there is a request which can be performed without using the A/D converter it is possible to respond to the request, even if the A/D converter is being used then. On the contrary, if there appears a request which requires use of the A/D converter, this fact is judged at the steps 266 and 268 and the operation moves to the step 262. Thus, the step skip is made in this case without responding to the above-mentioned request which requires the A/D converter. Being held in the set state, this request flag will be responded to when the A/D converter has completed its operation because request flags are successively responded to in the order of priority from a higher one to a lower one.

If judgement is made, at the step 266, that it is not necessary to use the A/D converter, the operation moves to the step 280. That is, the sensor 152, 154, 156 or 158 to which such judgement that it is not necessary to use the A/D converter may be made at the step 266. When the output of any one of these sensors is to be fetched, the operation moves to the step 280. At the step 280, the output is fetched from the sensor corresponding to the number n of the request flag $Q_n$. For example, if n=1 the output RPM of the sensor 152 is fetched. At the step 282, the data fetched at the step 280 is set in the address of the RAM 106 which is determined in accordance with the number n of the request flag $Q_n$. For example, when n=1, i.e. when $Q_n = Q_1$, the output RPM of the sensor 152 taken-in at the step 280 is set in the address A201 of the RAM 106 as shown in FIG. 4. Since the request flag $Q_n$ has been responded to at the steps 280 and 282, the flag $Q_n$ is reset at the step 284. Further, a flag $R_n$ corresponding to the flag $Q_n$ is set. When $Q_n=Q_1$, the flag $Q_1$ in the address A001 of FIG. 4 is reset and the flag G1 is set therein, at the step 284.

Next, explanation will be made about the taking-in operation of data which requires the A/D converter 112. As mentioned above, the starting instruction for the A/D converter 112 is issued at the step 270. In response to this starting instruction the A/D converter 112 begins its converting operation and the A/D conversion will be completed before long. To indicate this completion, an interruption service request signal (hereinafter abbreviated as INT signal) is issued from the A/D converter 112 and applied to the CPU 102. Although it is desirable that the INT signal is issued from the A/D converter 112 in view of economy in time, the INT signal may be produced by a suitable timer (not shown) other than the A/D converter. When the INT signal is produced by a timer, since the operating time required for A/D conversion by the A/D converter is predetermined, the timer is so arranged to apply the INT signal to the CPU 102 at the time after the lapse of a predetermined set time, which is a little longer than the required time for A/D conversion by the A/D converter from the beginning of the A/D conversion.

When the CPU 102 has responded to the INT signal at step 290, the operation of the CPU 102 is stopped and the processing moves from the step 290 to the step 292. The A/D converted data is taken-in from the A/D converter 112 at the step 292 and set in the RAM 106 based on the R-flag at the step 294. Then, at the step 296 the R-flag and the ADR-flag are reset and a G-flag is set. Thus, the data taking-in operation has been completed. Assume now that the flag $Q_o$ has been set in the address A000 of the RAM 106 in FIG. 4. At the step 270, the sensor 127 is selected by MPX 110 and the A/D converter 112 is started. At the step 272, the flag $Q_o$ is reset and the flag $R_o$ is set, in the address A000. The ADR-flag is also set in the address A100. Upon the application of the INT signal to the CPU 102, at the step 292 the output data of the A/D converter is taken into the CPU 102, and at the step 294 the address A200 is selected in response to the R-flag in the address A000 so as to set the data taken into the CPU 102 in the address A200. At the step 296 the flag $R_o$ in the address A000 is reset and the flag $G_o$ is set therein. The ADR-flag in the address A100 is also reset. The G-flag is not an absolutely necessary one. Accordingly, if only the operations are being normally performed there is no problem even if the G-flag is not used. The G-flag may be used, however, for confirming the operations. For example, the control circuit sets the flag $Q_o$ in the address A000 and at the same time resets the flag $G_o$. By checking the flag $G_o$ at the time before fetching the data from the address A200 after the lapse of a predetermined time from the setting of the flag $Q_o$, it is possible to judge whether the data in the address A200 is a newly taken-in data in response to the newly set flag $Q_o$ or an old data which has been held therein.

After the data setting at the step 294 or the step 284, the processing moves invariably passing through the step 254 so that the number n of the flag $Q_n$ is returned back to zero. Thus, after a data has been once set in the RAM 106, the checking is made invariably from the Q-flag having the highest one in the order of priority.

According to the invention, the A/D converter is so arranged as to preferentially perform the A/D conversion of the data of the sensor having the highest priority, resulting in improvement in total responsibility in input data fetching.

Further, in the embodiment as mentioned above, sensors and an A/D converter may be commonly used for plural control circuits.

Further, since data checking is made from the sensor of highest priority in the order of priority every time an operation for setting data into a RAM has been completed, the responsibility is very high to the data fetching request for the higher priority sensor.

Further, the control accuracy is also high because it is possible to determine the priority in accordance with the characteristics of the measurement value to be measured by each sensor.

Further, the resonsibility in taking-in data is also high, because the fetched data from any sensor which does not require use of the A/D converter can be performed even in the period during which the A/D converter is being used.

I claim:
1. For use in a motorcar controlling system having a plurality of sensors each for detecting respective analog data to produce a respective analog voltage output signal, a multiplexer connected to said sensors for selecting one of said sensors to produce only the analog voltage output signal of the selected sensor as an output thereof, an A/D converter for converting the output of said multiplexer into digital data and for producing the digital data as an output thereof, memory means for storing therein the output data of said A/D converter, and a plurality of digital controllers each operating on the basis of said digital data stored in said memory means and being capable of generating a request signal when data is desired from a selected sensor, a method of inputting data for controlling said motorcar comprising the steps of:
   (a) storing in a first area of said memory means request signals recieved from said controllers so as to disignate selected sensors from which data is desired by said controllers;
   (b) searching said first area of said memory means for a request signal;

(c) controlling said multiplexor to select a sensor on the basis of detection of a request signal in said first area of said memory means and initiating operation of said A/D converter;

(d) storing the output of said A/D converter in a second memory area of said memory means as data; and (e) transferring data stored in said second area of said memory means to the controller which generated the request signal initiating selection of the sensor from which the data was obtained, whereby said controller is operated on the basis of said data.

2. The method according to claim 1, further comprising storing said request signals in said first area of said memory means in a priority order according to a designated priority assigned to said sensors on the basis of the nature of the analog data sensed thereby and searching said first area of said memory means in said priority order.

3. The method according to claim 2, wherein said first area of said memory comprises a plurality of storage locations respectively assigned to said sensors in accordance with said priority order, and wherein said storing of request signals is effected in selected storage locations in accordance with the sensor from which data is requested by each request signal.

4. The method according to claim 3, further including resetting a request signal stored in said first area of said memory means after said multiplexor has been controlled in response thereto to select the sensor designated by the storage location in which that request signal was stored.

5. The method according to claim 2, wherein said system further comprises a plurality of additional sensors each producing a digital output signal to be stored in said second area of said memory means, and comprising the steps of determining whether a request signal stored in said first area of said memory means and detected during said searching step relates to a sensor producing an analog output signal or to an additional sensor producing a digital output signal to determine whether said A/D converter is required to convert the data from the sensor to digital form before storing in said second area of said memory means, determining whether said A/D converter is already being used when there is detected in said first area of said memory means a next request signal calling for use of said A/D converter, and skipping said next request signal in said priority order of searching when said A/D converter is in use.

6. The method according to claim 5, wherein when said next request signal in said priority order does not require use of said A/D converter, transferring the digital output signal from the additional sensor designated by said next request signal to said second area of said memory means without waiting for said A/D converter to complete its current operation.

* * * * *